United States Patent
Kalopissis et al.

[11] 3,925,474
[45] Dec. 9, 1975

[54] NITROPARAPHENYLENE DIAMINE DERIVATIVES AND METHODS OF MAKING THEM

[75] Inventors: Gregoire Kalopissis, Paris; Andree Bugaut, Boulogne-sur-Seine; Vahan Zorayan, Enghien-les-Bains, all of France

[73] Assignee: L'Oreal, Paris, France

[22] Filed: Dec. 15, 1971

[21] Appl. No.: 208,490

Related U.S. Application Data

[62] Division of Ser. No. 729,499, May 16, 1968, Pat. No. 3,694,140.

[30] Foreign Application Priority Data

May 16, 1967 Luxembourg.................53676

[52] U.S. Cl................. 260/570.5 P; 8/10; 8/10.1; 8/10.2; 8/11; 8/25; 8/26; 8/39; 8/54; 260/247.1 R; 260/247.5 R; 260/293.73; 260/293.74; 260/293.78; 260/397.7 R; 260/471 C; 260/501.15; 260/518 R; 260/518 A; 260/519; 260/556 B; 260/562 R; 260/567.6 M; 260/567.6 P; 260/573; 260/577
[51] Int. Cl.².................................. C07C 87/14
[58] Field of Search............................ 260/570.5 P

[56] References Cited
UNITED STATES PATENTS

| | | | |
|---|---|---|---|
| 3,049,393 | 8/1962 | Seemuller............. | 260/570.5 X |
| 3,560,136 | 2/1971 | Kalopissis et al........... | 260/570.5 X |
| 3,578,387 | 5/1971 | Zviak et al............. | 8/10.1 |
| 3,665,036 | 5/1972 | Kalopissis et al.......... | 260/556 |

FOREIGN PATENTS OR APPLICATIONS

| | | | |
|---|---|---|---|
| 1,502,965 | 11/1967 | France............. | 260/570.5 |

*Primary Examiner*—R. V. Hines
*Attorney, Agent, or Firm*—Cushman, Darby & Cushman

[57] ABSTRACT

Methods of making nitroparaphenylene diamine derivatives responding to the formula:

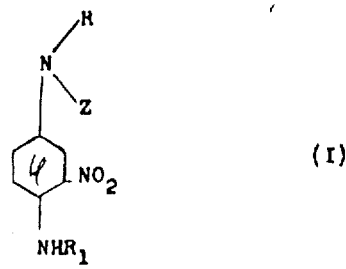

in which:
R represents H or a lower alkyl;
Z represents H, an

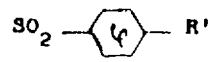

radical in which R' represents
H, methyl, or NO₂, or an OC—R'' radical in which R'' represents a lower alkyl;
and at least one of R and Z is H;
R₁ represents a lower alkyl, lower hydroxyalkyl, lower alkoxyalkyl or

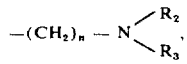

in which $n$ is a whole number between two and six inclusive, while $R_2$ and $R_3$ represent H, a lower alkyl, or a lower hydroxyalkyl, and the alkyl portion of R R''R₁ R₂ and R₄ having 1 to 6 carbon atoms.

Some of these derivatives are new compounds, and the invention includes new hair dyeing compositions comprising such compounds and the method of applying them to the hair.

3 Claims, No Drawings

NITROPARAPHENYLENE DIAMINE DERIVATIVES AND METHODS OF MAKING THEM

This is a division, of application Ser. No. 729,499, filed May 16, 1968 and now U.S. Pat. No. 3,694,140.

The present invention relates to a method of preparing compositions corresponding to the formula:

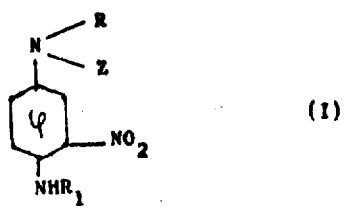

in which R represents hydrogen, or a lower alkyl radical, which may or may not be substituted, and especially a hydroxyalkyl, carboxyalkyl, carbamylalkyl or amino-alkyl radical, which may or may not be substituted on the amine function, the nitrogen of which may form part of a heterocyclic ring; and in which Z represents hydrogen, an

radical in which R' represents hydrogen, methyl, or an $NO_2$ group, or an OC-R'' radical in which R'' represents a lower alkyl, at least one of the Z and R radicals representing hydrogen; and in which $R_1$ represents a lower alkyl, lower hydroxyalkyl, lower alkoxyalkyl or

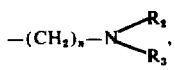

in which n is a whole number between two and six inclusive and $R_2$ and $R_3$ may be identical or different and represent a hydrogen atom, a lower alkyl, or a lower hydroxyalkyl, while the nitrogen atom adjacent $R_2$ and $R_3$ may form therewith a heterocyclic ring such as a morpholino or piperidine radical; and the alkyl portion of R R'' $R_1$ $R_2$ and $R_4$ having 1 to 6 carbon atoms and the corresponding quaternary derivatives. In this process an amine having the formula $R_1$-$NH_2$, in which $R_1$ has the significance hereinbefore indicated, is reacted with a compound responding to the formula:

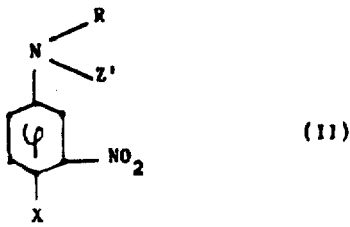

in which R has the significance hereinbefore indicated, X represents a halogen atom, and preferably chlorine, and Z' is an

group or an OC—R'', with R' and R'' having the significances hereinbefore indicated, after which, when it is desired to obtain a product in which Z represents hydrogen, the resulting product is subjected to acid hydrolysis.

The compounds according to formula (I) may be quaternized in a conventional manner, using a quaternizing agent such as methyl sulfate or an alkyl or aryl halide.

Another object of the present invention is to provide as new articles of manufacture the compounds responding to general formula (I) in which:

Z = H

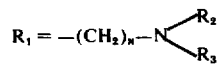

($R_2$ and $R_3$ having the significances hereinbefore assigned thereto), and

R = an alkyl amino, the amine function of which may be substituted, as well as compounds in which
Z = H
$R_1$ = alkoxy alkyl, and
R = H or alkyl, and compounds in which
R = H,
Z =

(R' having the significance hereinbefore indicated), and

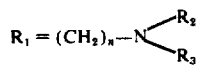

($R_2$ and $R_3$ having the significances hereinbefore indicated) as well as the corresponding quaternary derivatives, when these compositions comprise a tertiary amine function.

The above compositions are particularly suitable for use in dyeing keratinic fibers, and especially hair.

They have a strong affinity for fibers, good stability under exposure to light and inclement weather, and are very soluble in water.

It is consequently another object of this invention to provide a new composition for dyeing keratinic fibers, and particularly hair, essentially characterized by the fact that it comprises at least one of the above-defined dyes in solution.

The dyeing compositions according to the invention are preferably simple aqueous solutions having a pH value between 4 and 10 and preferably between 7 and 10 inclusive.

These dyeing compositions may also comprise various ingredients conventionally used in hair dyes, such for example, an organic solvents, thickeners, detergents, emollients, perfumes and lacquers. The dyes according to the invention may also be mixed with each other, or with other dyes, such as nitro, azo, or anthraquinone dyes, or any other type of dye used to color hair.

These dyes may be used without employing an oxidizing agent. The time of contact with the hair may vary within broad limits, but lies preferably between 5 and 30 minutes. The compositions according to the invention may be used at various temperatures, but are preferably applied at room temperature. The concentration of the dyes may also vary over a broad range, but is preferably selected between 0.1 and 3% by weight.

The present invention also comprises a method of dyeing hair essentially characterized by the fact that a hair dyeing composition as hereinbefore described is applied to the hair for between 5 and 30 minutes, after which the hair is washed, rinsed, and dried.

In order that the invention may be better understood, several methods of synthesizing the compositions of formula (I) and using said compositions to dye hair will now be described.

EXAMPLE 1

Preparation of 1-hexylamino-2-nitro-4-amino benzene.

0.1 mol (21.5 g) of 2-nitro-4-acetylamino chlorobenzene is dissolved in 2 mols (202 g) of hexylamine. This is heated to reflux for 8 hours. The excess aliphatic amine is driven off under vacuum. The resulting oily residue is treated with 200 cm$^3$ of a normal hydrochloric acid solution cooled to 0°C. The mixture is then dried, and washing with alcohol yields 15 g of practically pure 1-hexylamino-2-nitro-4-amino benzene hydrochloride. This product results from the de-acetylation of part of the 1-hexylamino-2-nitro-4-acetylamino benzene formed after substitution of the chlorine atom. The hydrochloride, when treated with ammoniacal solution, forms 12.8 g of 1-hexylamino-2-nitro-4-amino benzene which, after recrystallization in toluene, melts at 75°C. Analysis of this product yields the following results:

| Analysis | Calculated for $C_{12}H_{19}N_3O_2$ | Found |
| --- | --- | --- |
| C % | 60.76 | 60.95 – 60.84 |
| H % | 8.01 | 8.22 – 8.19 |
| N % | 17.72 | 17.69 – 17.71 |

EXAMPLE 2

Preparation of 1-N-β-diethylaminoethylamino-2-nitro-4-acetylamino benzene.

0.065 mol (14 g) of 2-nitro-4-acetylamino chlorobenzene (which acetylated derivative melts at 147°C and is obtained by heating 2-nitro-4-amino-chlorobenzene in acetic anhydride) is dissolved in 1.04 mols (12 g) of N,N, diethylethylenediamine. This solution is heated for 3 hours at 140°C, and the excess aliphatic diamine is then driven off under vacuum. The oily residue is treated with 8 cc of acetic anhydride to reacetylate the primary aromatic amine which was partially de-acetylated during the reaction. The mixture is then poured into water which has been alkalized to a pH of 12 by means of a sodium hydroxide solution, and the desired product extracted by means of methylisobutylketone. The methylisobutylketone solution is extracted by means of an 0.25 times normal hydrochloric acid solution. The aqueous hydrochloric acid is alkalized to pH 12 and drying yields 10 g of 1-N-β-diethylaminoethylamino-2-nitro-4-acetylamino benzene which melts at 98°C.

EXAMPLE 3

Preparation of 1-N-β-diethylaminoethylamino-2-nitro-4-amino benzene.

The product prepared in Example 2 is hydrolized with hydrochloric acid to form 1-N-β-diethylaminoethylamino-2-nitro-4-amino benzene, which melts at 65°C.

EXAMPLE 4

Preparation of methyl-β-[N-(2-nitro-4-acetylamino)phenyl]-aminoethyl-methyldiethylammonium sulfate.

1-N-β-diethylamino-2-nitro-4-acetylamino benzene is obtained as described as in Example 2. 0.017 mols (5 g) of this compound is dissolved in 50 cc of chlorobenzene at 40°C. 0.019 mol (1.8 cc) of methyl sulfate is added little by little, while stirring and the reaction mixture is kept at 40°C for 4 hours. After cooling, drying yields 6.36 of the desired quaternary ammonium salt, which melts at 133°C. After recrystallization in alcohol, the product, on analysis, yields the following results.

| Analysis | Calculated for $C_{16}H_{28}N_4O_7S$ | Found |
| --- | --- | --- |
| C % | 45.71 | 45.94 – 45.89 |
| H % | 6.67 | 6.76 – 6.69 |
| N % | 13.33 | 13.11 – 13.10 |

EXAMPLE 5

Preparation of 1-N-β-diethylaminoethylamino-2-nitro-4-N'-methylamino benzene.

0.011 mol (5 g) of 1-N-β-diethylaminoethylamino-2-nitro-4-(N'-methyl-N'-benzylsulfonyl)amino-benzene monohydrochloride, prepared as described in Example 10 of a U.S. Pat. application being filed on the same day as the present application, by GREGOIRE KALOPISSIS, ANDREE BUGAUT and VAHAN ZORAYAN, is added little by little, while stirring, to 30 cc of sulfuric acid at 0°C. When this has completely dissolved, the reaction mixture is left to stand for six hours at room temperature, and then poured into 300 cc of ice water. Alkalization with a 5 times normal sodium hydroxide solution and drying yields 3.1 g of 1-N-β-diethylaminoethylamino-2-nitro-4-N'-methylamino benzene, which melts at 74°C.

EXAMPLE 6

Preparation of 1-N-β-hydroxyethylamino-2-nitro-4-N'-methylamino benzene.

0.0288 mol (10.1 g) of 1-N-β-hydroxyethylamino-2-nitro-4-(N'-methyl-N'-benzenesulfonyl)-amino benzene, the preparation of which has been described in Example 12 of the above-mentioned U.S. Pat. application filed on the same day as the present application, is dissolved in 20 cc of concentrated hydrochloric acid which has first been brought to 95°C. This is heated for an hour in a boiling water-bath, 20 cc of water is then added, the mixture is cooled to −10°C, and drying then yields 5.5 g of practically pure 1-N-β-hydroxyethylamino-2-nitro-4-N'-methylamino benzene monohydrochloride. This hydrochloride, when treated with a normal sodium hydroxide solution, yields 4.5 g of 1-N-β-hydroxyethylamino-2-nitro-4-N'-methylamino benzene which melts at 123°C.

EXAMPLE 7

First method of preparing 1-N-γ-methoxypropylamino-2-nitro-4-N'-methylamino benzene hydrochloride.

0.02 mol (7.58 g) of N-γ-methoxypropylamino-2-nitro-4-(N'-methyl-N'-benzenesulfonyl)amino benzene, the preparation of which has been described in the aforementioned U.S. Patent application, filed on the same day as the present application, is dissolved in 35 cm$^3$ of sulfuric acid at 0°C. The reaction mixture is left to stand for 10 hours, poured into 500 cc of cracked ice and alkalized with a 5 times normal sodium hydroxide solution. The desired product is then extracted by means of methylisobutylketone. After washing, the methylisobutylketone solution with water, and drying it with sodium sulfate, the solvent is evaporated under a vacuum. The oil residue is dissolved in 20 cc of propanol. After bubbling dry hydrochloric acid into the iced propanolic solution, drying yields 5.10 g of 1-N-γ-methoxypropylamino-2-nitro-4-N'-methylamino benzene hydrochloride, which melts and decomposes between 115° and 120°C. Analysis of the product yields the following results:

| Analysis | Calculated for $C_{11}H_{17}O_3N_3$ HCl | Found |
|---|---|---|
| C % | 47.91 | 47.99 – 48.09 |
| H % | 6.53 | 6.56 – 6.70 |
| N % | 15.25 | 15.08 – 15.12 |

EXAMPLE 8

Second method of preparing 1-γ-methoxypropylamino-2-nitro-4-methylamino benzene hydrochloride.

0.0071 mol (2 g) of 1-γ-methoxypropylamino-2-nitro-4-(N-methyl-N-acetyl)-amino benzene prepared as described in Example 14 of the above-mentioned U.S. Pat. application filed on the same day as the present application, is heated for 1 hour and 30 minutes in a boiling water bath in 20 cc of concentrated hydrochloric acid to which 40 cc of water has been added. After cooling, the reaction mixture is diluted, alkalized with a five times normal sodium hydroxide solution, and drying yields 1.61 g of 1-γ-methoxypropylamino-2-nitro-4-N-methylamino benzene, which after recrystallization in benzene, melts at 52°C. After dissolving this product in propanol and bubbling hydrochloric acid thereinto, the corresponding hydrochloride is obtained.

EXAMPLE 9

Preparation of 1-N-β-diethylaminoethylamino-2-nitro-4-(N'-β-diethylaminoethyl)-amino benzene.

0.0387 mol (19 g) of 1-N-(β-diethylaminoethyl)-amino-2-nitro-4-(N'-β-diethylaminoethyl-N'-benzene sulfonyl)-amino benzene is dissolved in 76 cc of concentrated sulfuric acid while maintaining its temperature at 40°C. The reaction mixture is kept at this temperature for 4 hours and then poured into 600 cc of ice water, after which it is alkalized with a 5 times normal sodium hydroxide solution and the desired product is then extracted with methylisobutylketone. After washing the methylisobutylketone solution and drying it on sodium sulfate, the solvent is evaporated under vacuum, thereby isolating in the form of a violet oil, 12 g of practically pure 1-N-(β-diethylaminoethyl)amino-2-nitro-4-N'-(β-diethylaminoethyl)amino benzene. Analysis of this product yields the following results:

| Analysis | Calculated for $C_{16}H_{33}N_5O_2$ | Found |
|---|---|---|
| C % | 61.53 | 61.54 – 61.49 |
| H % | 9.40 | 9.42 – 9.25 |
| N % | 19.94 | 20.10 – 20.15 |

EXAMPLE 10

Preparation of 1-N-β-aminoethylamino-2-nitro-4-benzenesulfonyl benzene.

0.1 mol (31.2 g) of 2-nitro-4-benzenesulfonylamino chlorobenzene is dissolved in 2 mols (120 g) of ethylenediamine in the presence of 50 cc of water. This is brought to reflux for 22 hours, the excess ethylenediamine is driven off under vacuum, the oily residue is dissolved in 200 cc of a twice normal hydrochloric acid solution at 50°C, cooled to 0°C for 24 hours and drying then yields 25.7 g of 1-N-β-aminoethylamino-2-nitro-4-benzenesulfonylamino benzene monohydrochloride which, after recrystallization in a normal hydrochloric acid solution, melts and decomposes at 237°C. Analysis of this product yields the following results:

| Analysis | Calculated for $C_{14}H_{16}O_4N_4S_1HCl$ | Found |
|---|---|---|
| N % | 15.03 | 15.08 – 15.13 |
| Cl % | 8.59 | 8.72 – 8.78 |

EXAMPLE 11

Preparation of 1-N-β-aminoethylamino-2-nitro-4-amino-benzene dihydrochloride.

0.1 mol (37.2 g) of 1-N-β-aminoethylamino-2-nitro-4-benzenesulfonylamino benzene monohydrochloride, prepared as described in Example 10 of the present application, is heated for 3 hours in a boiling water-bath in 500 cc of concentrated hydrochloric acid. Cooling and drying yields 26 g of 1-N-β-aminoethylamino-2-nitro-4-amino benzene dihydrochloride.

EXAMPLE 12

Preparation of 1-N-γ-hydroxypropylamino-2-nitro-4-N'-methylamino benzene.

0.0075 mol (2 g) of 1-N-γ-hydroxypropylamino-2-nitro-4-(N-methyl-N-acetyl)amino benzene, which has been prepared as described in Example 16 of the hereinbefore mentioned U.S. patent application filed on the same day as the present U.S. application, is heated for an hour in a boiling water-bath in 20 cc of concentrated hydrochloric acid mixed with 40 cc of water. After cooling, this mixture is alkalized with a 5 times normal sodium hydroxide solution, and drying yields 1.6 g of 1-N-γ-hydroxypropylamino-2-nitro-4-N'-methylamino benzene which, after recrystallization in toluene, melts at 107.5°C. Analysis of this product yields the following results:

| Analysis | Calculated for $C_{10}H_{15}O_3N_3$ | Found |
| --- | --- | --- |
| C % | 53.33 | 53.37 – 53.23 |
| H % | 6.67 | 6.65 – 6.74 |
| N % | 18.67 | 18.72 – 18.87 |

EXAMPLE 13

Preparation of 1-N-β-diethylaminoethylamino-2-nitro-4-N'-β-hydroxyethylamino benzene dihydrochloride.

0.0106 mol (5 g) of 1-N-β-diethylaminoethylamino-2-nitro-4-(N'-β-hydroxyethyl-N'-benzenesulfonyl-)amino benzene monohydrochloride, prepared as described in Example 17 of the hereinbefore mentioned U.S. patent application filed on the same day as the present application, is heated for an hour in a boiling water bath in 10 cc of concentrated hydrochloric acid. The reaction mixture is poured into 100 cc of ice water, alkalized with a 5 times normal sodium hydroxide solution, and the desired product is extracted with methylisobutylketone. After washing the methylisobutylketone solution with water and drying it on sodium sulfate, the solvent is evaporated under vacuum. The oily residue is dissolved in 20 cc of propanol. After bubbling, dry hydrochloric acid into the iced propanolic solution, drying yields 3.5 g of 1-N-β-diethylaminoethylamino-2-nitro-4-N'-β-hydroxyethylamino benzene dihydrochloride which, after recrystallization in a mixture of propyl alcohol and concentrated hydrochloric acid, melts and decomposes between 178° and 183°C. Analysis of this product yields the following results:

| Analysis | Calculated for $C_{14}H_{26}N_4O_3Cl_{22}$ | Found |
| --- | --- | --- |
| C % | 45.52 | 45.64 – 45.69 |
| H % | 7.04 | 7.11 – 7.25 |
| N % | 15.17 | 15.38 – 15.23 |

EXAMPLE 14

The following composition is prepared:

| | |
| --- | --- |
| 1 — (N-β-diethylaminoethyl)amino-2-nitro-4-(N'-β-diethylaminoethyl)amino benzene trihydrochloride | 0.4 g |
| isooctylphenylpolyethoxyethanol | 1.5 g |
| NH₄OH q.s.p. | pH 9 |
| water, q.s.p. | 100 g |

When this is applied to natural light chestnut hair and left thereon for 10 minutes, a grayish purple shade results.

EXAMPLE 15

The following composition is prepared:

| | |
| --- | --- |
| 1-N-γ-methoxypropylamino-2-nitro-4-N'-methylamine benzene | 1.2 g |
| isooctylphenylpolyethoxyethanol | 1.3 g |
| sodium carbonate, q.s.p. | pH 9 |
| water, q.s.p. | 100 g |

This composition is applied to natural light chestnut hair left thereon for 10 minutes, rinsed and shampooed. The result is a grayish purple shade.

We claim:

1. A method for preparing a compound of the formula

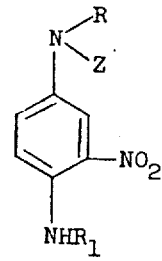

in which R is selected from the group consisting of hydrogen, lower alkyl having 1–6 carbon atoms, aminoalkyl having 1–6 carbon atoms, amino dialkyl wherein each of the alkyl moieties has 1–6 carbon atoms and alkylaminodialkyl wherein each of the alkyl moieties has 1–6 carbon atoms, Z is hydrogen, and $R_1$

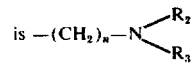

in which n is a whole number between 2 and 6 inclusive and $R_2$ and $R_3$ are selected from the group consisting of hydrogen, lower alkyl having 1–6 carbon atoms and lower hydroxyalkyl having 1–6 carbon atoms, with the proviso that R is other than hydrogen and lower alkyl having 1–6 carbon atoms when $R_2$ and $R_3$ are both lower alkyl having 1–6 carbon atoms, which method comprises the steps of reacting an amine of the formula $R_1$—$NH_2$, in which $R_1$ has the significance hereinbefore indicated, with a compound of the formula

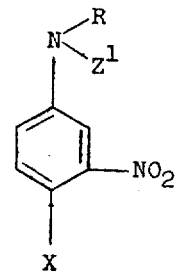

in which

R has the significance hereinbefore indicated,

X represents halogen, $Z^1$ is selected from the group consisting of

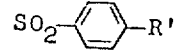

and OC—R" in which R' is selected from the group consisting of hydrogen, methyl and $NO_2$ and R" is lower alkyl having 1–6 carbon atoms and acid hydrolyzing the resulting product to yield said compound.

2. A compound selected from the group consisting of
a. a compound of the formula

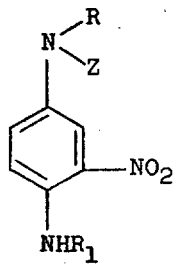

in which R is selected from the group consisting of hydrogen, alkyl having 1–6 carbon atoms, amino-alkyl having 1–6 carbon atoms, amino dialkyl wherein each of the alkyl moieties has 1–6 carbon atoms and alkyl amino-dialkyl wherein each of the alkyl moieties has 1–6 carbon atoms, Z is hydrogen, and $R_1$ represents

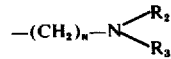

in which $n$ is a whole number between 2 and 6 and $R_2$ and $R_3$ are selected from the group consisting of hydrogen, lower alkyl having 1–6 carbon atoms and lower hydroxyalkyl having 1–6 carbon atoms, with the proviso that R is other than hydrogen and lower alkyl having 1–6 carbon atoms when $R_2$ and $R_3$ are both lower alkyl having 1–6 carbon atoms and
b. the quaternized compound of (a).

3. The compound of claim 2 which is 1-N-β-diethylaminoethylamino-2-nitro-4-(N'-β-diethylaminoethyl)-amino benzene.

* * * * *